United States Patent
Coffey et al.

(10) Patent No.: US 10,796,727 B1
(45) Date of Patent: Oct. 6, 2020

(54) USING SOLID STATE DEPOSITION IN THE MANUFACTURE OF DATA STORAGE DEVICES, AND RELATED DEVICES AND COMPONENTS THEREOF

(71) Applicant: Seagate Technology LLC, Cupertino, CA (US)

(72) Inventors: Jerome Coffey, Boulder, CO (US); Sam Severson, Longmont, CO (US); David Lapp, Boulder, CO (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 16/406,794

(22) Filed: May 8, 2019

(51) Int. Cl.
*G11B 33/14* (2006.01)
*G11B 25/04* (2006.01)
*G11B 33/02* (2006.01)

(52) U.S. Cl.
CPC ........ *G11B 33/1446* (2013.01); *G11B 25/043* (2013.01); *G11B 33/022* (2013.01); *G11B 33/1466* (2013.01); *Y10T 29/49025* (2015.01)

(58) Field of Classification Search
None
See application file for complete search history.

(56) References Cited

U.S. PATENT DOCUMENTS

| | | | |
|---|---|---|---|
| 5,156,919 A | 10/1992 | Brar et al. | |
| 5,187,625 A | 2/1993 | Blaeser et al. | |
| 5,627,701 A | 5/1997 | Misso et al. | |
| 5,835,311 A | 11/1998 | Brooks, Jr. et al. | |
| 5,973,883 A | 10/1999 | Yanagisawa | |
| 6,087,620 A | 7/2000 | Brooks, Jr. et al. | |
| 6,091,578 A | 7/2000 | Stole et al. | |
| 6,151,198 A | 11/2000 | Prater et al. | |
| 6,359,755 B1 | 3/2002 | Dietzel et al. | |
| 6,731,472 B2 | 5/2004 | Okamoto et al. | |
| 6,813,120 B1 | 11/2004 | Misso | |
| 7,224,554 B2 | 5/2007 | Wright | |
| 7,522,382 B1 | 4/2009 | Pan | |

(Continued)

FOREIGN PATENT DOCUMENTS

| | | |
|---|---|---|
| CN | 203872476 U | 10/2014 |
| JP | 61039901 A | 2/1986 |

(Continued)

OTHER PUBLICATIONS

"Cold Spray Repair of Magnesium" May 17, 2011 presented at Cold Spray Action Team workshop in Salisbury Room 115 in Kinnicutt Hall on the Worcester Polytehnic Institute, retrieved at https://www.coldsprayteam.com/files/Gabriel_CSAT_2011.pdf , (44 pages).

(Continued)

*Primary Examiner* — Craig A. Renner
(74) *Attorney, Agent, or Firm* — Kagan Binder, PLLC

(57) ABSTRACT

The present disclosure relates to using solid state deposition to selectively and strategically manage one or more properties of one or more portions of a data storage device. Material deposited via solid-state deposition can be used to prepare a surface for subsequent treatment (e.g., welding), to join two or more substrates together, and/or to seal one or more joints or surfaces to control, e.g., the humidity in the interior of a data storage device. The present disclosure also involves related data storage devices.

8 Claims, 9 Drawing Sheets

(56) References Cited

U.S. PATENT DOCUMENTS

| | | |
|---|---|---|
| 7,623,320 B2 | 11/2009 | Johnson et al. |
| 7,701,672 B2 | 4/2010 | Zeng et al. |
| 8,416,531 B2 | 4/2013 | Benda |
| 8,533,934 B2 | 9/2013 | McGuire, Jr. et al. |
| 9,162,251 B2 | 10/2015 | Hirano et al. |
| 9,765,435 B2 | 9/2017 | Zahiri et al. |
| 9,805,750 B1 | 10/2017 | Ramakrishnan et al. |
| 9,905,907 B2 | 2/2018 | Wang et al. |
| 9,951,425 B2 | 4/2018 | Lancaster-Larocque et al. |
| 10,359,804 B2 | 7/2019 | Hamel et al. |
| 2002/0057536 A1 | 5/2002 | Boutaghou et al. |
| 2002/0182311 A1 | 12/2002 | Leonardi et al. |
| 2007/0002489 A1* | 1/2007 | Abe ............ G11B 25/043 360/97.21 |
| 2007/0171578 A1 | 7/2007 | Kamigama et al. |
| 2007/0241164 A1* | 10/2007 | Barnes et al. ..... B23K 20/1275 228/101 |
| 2008/0259503 A1* | 10/2008 | Aoyagi et al. ..... G11B 33/1466 360/244 |
| 2009/0195919 A1 | 8/2009 | Mahadev |
| 2010/0015467 A1 | 1/2010 | Zimmermann et al. |
| 2014/0339093 A1 | 11/2014 | Lancaster-Larocque et al. |
| 2015/0015990 A1 | 1/2015 | Chou et al. |
| 2017/0169862 A1 | 6/2017 | Sudo et al. |
| 2017/0260622 A1 | 9/2017 | Koestenbauer et al. |

FOREIGN PATENT DOCUMENTS

| | | | |
|---|---|---|---|
| JP | 61202302 | A | 9/1986 |
| JP | 61248201 | A | 11/1986 |
| JP | 62117101 | A | 5/1987 |
| JP | 06295542 | A | 10/1994 |
| JP | 07254246 | A | 10/1995 |
| JP | 2007253172 | A | 10/2007 |
| WO | 9828467 | A1 | 7/1998 |
| WO | 2013149291 | A1 | 10/2013 |

OTHER PUBLICATIONS

CSAT 2018, retrieved at https://www.coldsprayteam.com/csat2018.html, Jun. 2018, (2 pages).

Helfritch, "Economics of Cold Spray-Cost Analysis", May 17, 2011 presented at Cold Spray Action Team workshop in Salisbury Room 115 in Kinnicutt Hall on the Worcester Polytehnic Institute, retrieved at https://www.coldsprayteam.com/2011CSATmeeting.html, (8 pages).

McDonald et al., "Cold Spray Activities in Canada", Nov. 30, 2016, presented at North American Cold Spray Conference 2016 Alberta Innovates—Technology Futures (AITF) 250 Karl Clack Road Edmonton, AB, Canada, retrieved at https://www.asminternational.org>documents>1+-+McDonald.pdf, (32 pages).

"Titomic to 3D Print Callaway Golf Clubs", Posted on May 15, 2019, (1 page).

"Existing Commercial use of Cold Spray", Retrieved on Feb. 8, 2019 via https://www.marsctechnologies.com/existing-commercial-use, (6 pages).

Moridi et al., "Cold spray coating: review of material systems and future perspectives", Institute of Materials, Minerals and Mining, vol. 36, No. 6, pp. 369-395, Mar. 5, 2014, (27 pages).

"Cold Spraying", Retrieved on Sep. 27, 2018 via https://www.twi-globa.1.com/capabilities/materials-and-corrosion-management/surface-engineering-and-advanced-coatings/cold-spraying/, (2 pages).

Unpublished Utility U.S. Appl. No. 16/406,728, filed May 8, 2019 (Not attached).

Yamauchi et al., "Interfacial state and characteristics of cold-sprayed copper coatings on aluminum substrate", Materials Science and Engineering 61, 2014, (8 pages).

"Titomic granted US patent for cold-spray titanium Additive Manufacturing", dated Oct. 13, 2017, retrieved from https://www.metal-am.com/titomic-granted-us-patent-cold-spray-titanium-additive-manufacturing/, (1 page).

Irissou et al., "Review on Cold Spray Process and Technology: Part I—Intellectual Property", Journal of Thermal Spray Technology, vol. 17(4), pp. 495-516, Dec. 2008, (22 pages).

Rybdylova et al., "Aerodynamic focusing of inertial particles in supersonic micronozzles", Proc. Appl. Math. Mech. 13, 503-504 (2013), (2 pages).

"Materials Deposition, Cold Spray", Department of Defense Manufacturing Process Standard, Aug. 4, 2008, (19 pages).

"Kinetic Metallization: Coatings Once Thought Impossible", retrieved from https://www.inovati.com/ on May 21, 2019, (3 pages).

"Cold Spray Repair of Magnesium", ARL Center for Cold Spray, May 17, 2011, (44 pages).

Murray et al., "Design and Production of Powders Tailored to Cold Spraying", retreived from: https://www.materials.sandvik/globalassets/global/downloads/products_downloads/metal_powders/technical_papers/design-and-production-of-powders-tailored-to-cold-spraying.pdf, on Oct. 29, 2019, (4 pages).

Widener et al., "B1 Bomber-FEB Panel Repair by Cold Spray", CSAT Meeting: WPI, Worcester, MA, Oct. 30, 2012, (29 pages).

"Cold Spray Applications", Retrieved from https://www.coldsprayteam.com/aboutcoldspray.html, CSAT 2019 Presentations, 2019, (3 pages).

Champagne et al., "Critical Assessment 11: Structural repairs by cold spray", Materials Science and Technology, vol. 31, No. 6, Nov. 27, 2014, (27 pages).

Hoey et al., "CAB-DWTM for 5 μm trace-width deposition of solar cell metallization top-contacts", Jun. 2009, (7 pages).

Singh et al., "Cold spray technology: Future of coating deposition processes", Frattura ed Integrità Strutturale, 69-84, Oct. 2012, (17 pages).

* cited by examiner

USING SOLID STATE DEPOSITION IN THE MANUFACTURE OF DATA STORAGE DEVICES, AND RELATED DEVICES AND COMPONENTS THEREOF

CROSS-REFERENCE TO RELATED APPLICATION

The present application is related to U.S. nonprovisional patent application titled "DATA STORAGE DEVICES, AND RELATED COMPONENTS AND METHODS OF MAKING" by Coffey et al. having application No. 16/406,728 and filed on even date herewith, wherein the entirety of said application is incorporated herein by reference.

BACKGROUND

The present disclosure relates to data storage device housing components, components within a data storage device, and related data storage devices.

SUMMARY

The present disclosure includes embodiments of a method of joining a first data storage device component and a second data storage device component, wherein the method includes:

a) providing the first data storage device component, wherein the first data storage device component includes a first metallic substrate;

b) providing the second data storage device component, wherein the second data storage device component includes a second metallic substrate;

c) applying at least one solid-state, metallic deposition layer over at least a portion of one or more surfaces of the first metallic substrate and/or at least a portion of one or more surfaces of the second metallic substrate;

d) aligning at least a portion of the first metallic substrate and at least a portion of the second metallic substrate along a joint line, wherein at least a portion of the at least one solid-state, metallic deposition layer is along at least a portion of the joint line; and e) welding the first metallic substrate to the second metallic substrate along the joint line.

The present disclosure also includes embodiments of a data storage device housing intermediate including:

a) a first data storage device housing component having a first metallic substrate;

b) a second data storage device housing component having a second metallic substrate wherein at least a portion of the first metallic substrate is aligned with at least a portion of the second metallic substrate along a joint line, wherein the first metallic substrate is not physically attached to the second metallic substrate at the joint line; and c) at least one solid-state, metallic deposition layer covering at least a portion of the first metallic substrate and/or at least a portion of second metallic substrate along at least a portion of the joint line.

The present disclosure also includes embodiments of a data storage device including:

a) a housing, wherein the housing includes at least a first substrate defining a data storage device interior and data storage device exterior, wherein the first substrate includes a joint line between the first substrate and a second substrate that is physically secured to the first substrate; and b) at least one solid-state deposition layer covering at least a portion of the joint line to seal the interior of the data storage device from the exterior along the portion of the joint line that is covered by the at least one solid-state deposition layer.

The present disclosure also includes embodiments of a data storage device including:

a) a housing, wherein the housing includes at least a first substrate a joint line between the first substrate and a second substrate; and b) at least one solid-state deposition layer covering at least a portion of the joint line to physically couple the first substrate to the second substrate.

The present disclosure also includes embodiments of a method of sealing a joint in a data storage device, wherein the method includes:

a) providing a data storage device housing, wherein the housing includes at least a first substrate defining a data storage device interior and a data storage device exterior, wherein the first substrate includes a joint line between the first substrate and a second substrate (e.g., the second substrate may already be physically secured to the first substrate); and b) applying at least one solid-state deposition layer over at least a portion of the joint line to seal the interior of the data storage device from the exterior along the portion of the joint line that is covered by the at least one solid-state deposition layer.

The present disclosure also includes embodiments of a method of joining substrates of a data storage device comprising:

a) providing at least a first substrate and a second substrate, wherein the first substrate is positioned adjacent to the second substrate to form a joint line between the first substrate and the second substrate; and b) applying at least one solid-state deposition layer over at least a portion of the joint line to physically join the first substrate and second substrate.

DETAILED DESCRIPTION

The present disclosure relates to using solid state deposition to selectively and strategically manage one or more properties of one or more portions of a data storage device. As described in detail below, material deposited via solid-state deposition can be used to prepare a surface for subsequent treatment (e.g., welding), to join two or more substrates together, and/or to seal one or more joints or surfaces to control, e.g., the humidity in the interior of a data storage device.

Non-limiting examples of data storage devices include hard disk drives (internal and/or external), solid state drives (external and/or internal), network attached storage (NAS), flash storage devices, and the like. The present disclosure illustrates several embodiments of a hard disk drive as one type of a data storage device.

Figure 1:
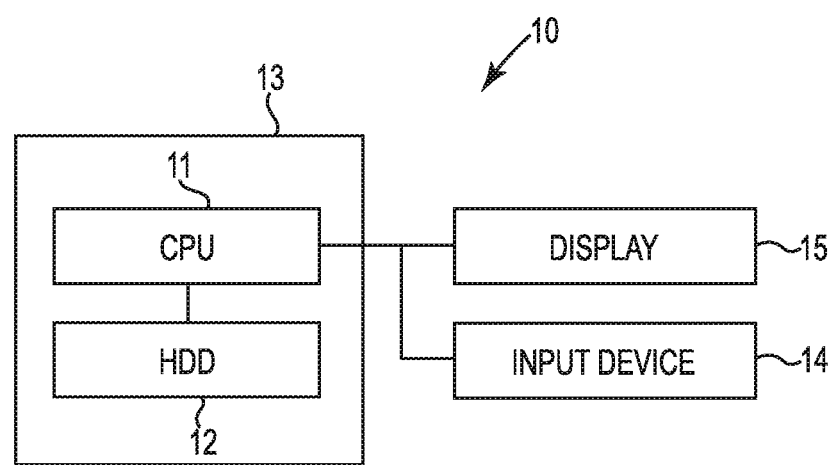
FIG. 1 is a block diagram schematically illustrating the structure of a computer apparatus that includes a hard disk drive as data storage device.

FIG. 1 schematically illustrates the structure of a computer apparatus 10. The computer apparatus 10 includes a computer unit 13 assembled with a central processing unit (CPU) 11, and a hard disk drive (HDD) 12 as a data storage device. The CPU 11 is capable of sending and receiving information data to and from the HDD 12 in accordance with instructions input from an input device 14, such as a keyboard and/or a mouse, which is connected to the computer unit 13. The information data may be displayed on a screen of a display device 15 which is connected to the computer unit 13.

Figure 2:
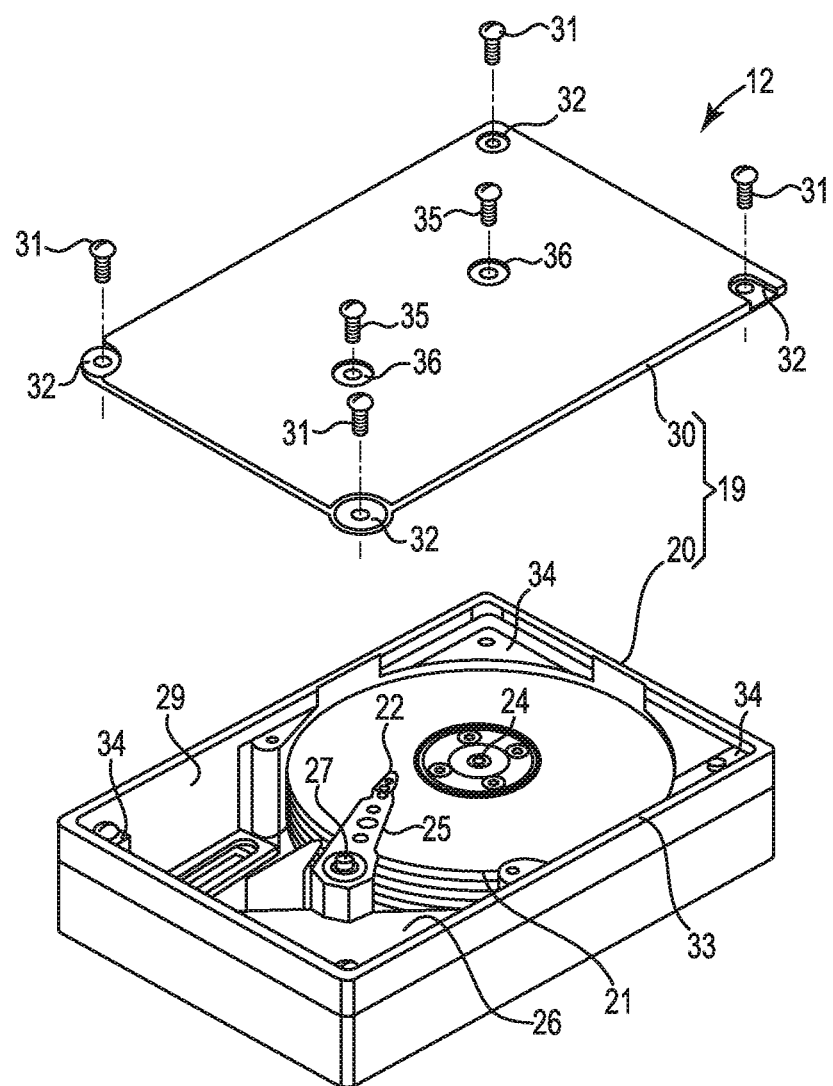
FIG. 2 is an exploded perspective view of a hard disk drive.

FIG. 2 illustrates an exploded perspective view of an HDD 12. As shown, HDD 12 includes a housing 19 having base 20 and at least one top cover plate 30 (also referred to as a cover). In some embodiments, top cover plate 30 can be a final cover plate mounted over a process cover plate. As shown in FIG. 2, base 20 is a box-shaped housing component.

As shown, the base 20 can accommodate one or more magnetic disks 21 as recording media for recording information data, and magnetic heads 22 opposed to the disk surfaces of the respective recording disks 21 for reading and writing information. The recording disks 21 may rotate about a rotation axis 24 fixed to the base 20. The rotation of the disks 21 can be driven by a spindle motor, not shown. An actuator arm 25 of an actuator arm assembly, with the magnetic head 22 at the tip end, may swing about an actuator arm axis 27 fixed to the base 20. As shown, the swinging movement of the actuator arm 25 is caused by a magnetic circuit 26 that includes an actuator. The magnetic heads 22 are positioned to a target recording track and block through the rotation of the disks 21 and the swinging movement of the actuator arm 25.

A top cover plate 30 can close a housing opening 29 of the base 20. The top cover plate 30 can be fastened to the base 20 by a variety of fasteners. As shown, top cover plate 30 can be coupled to the base 20 using screws 31 positioned at four corners of the top cover plate 30 so as to form the housing 19. As shown, screw receiving recesses 32 are formed at the corners of the top cover plate 30 so as to prevent the heads of the screws 31 from protruding from the level of the surface of the top cover plate 30. Steps 34 can be formed on the base 20 inside a housing edge 33 at the corners for receiving the screw receiving recesses 32 of the top cover plate 30. When the steps 34 receive the screw receiving recesses 32, the surface of the top cover plate 30 is leveled with the housing edge 33. Moreover, the heads of the screws 31 are prevented from protruding from the surface of the top cover plate 30.

When the top cover plate 30 is coupled to the base 20, two connecting screws 35 can be screwed into the tip ends of the rotation axis 24 and the axis 27. As shown, connecting screw receiving recesses 36 are formed in the top cover plate 30 so as to prevent the heads of the connecting screws 35 from protruding from the level of the surface of the top cover plate 30. The top cover plate 30 may be formed by a press from a metal plate such as aluminum. The press can shape the screw receiving recesses 32 and the connecting screw receiving recesses 36 on the top cover plate 30.

According to the present disclosure, one or more one solid-state layers can be deposited onto at least a portion of one or more surfaces of a variety of data storage device components for one or more purposes as illustrated in detail below. For example, material deposited onto a surface of one or more data storage device components via solid-state deposition can be used to treat the surfaces prior to welding (e.g., prior to friction-stir welding, laser welding, and the like). As another example, one or more solid-state deposition layers can be used to join two or more parts of a data storage device. As yet another example, one or more solid-state deposition layers can be used to seal a surface of a data storage device housing with respect to, e.g., humidity, so as to help control the humidity in the interior of a data storage device during testing and/or in the final product.

As used herein, a "data storage device component" refers to a variety of components that are part of a data storage device. For example, a data storage device component includes components that are primarily used to form a housing ("data storage device housing components") and components located inside the housing, outside the housing, or mounted in a housing component wall and are primarily related to the operation of the data storage device. Nonlimiting examples of data storage device components include electrical connectors such as pass-through connectors, fasteners, and the like. A pass-through connector is a data storage device component that permits electrical signals to be passed between the exterior of data storage device and the interior of the data storage device. A variety of fasteners can be used to assemble a variety of components in a data storage device. As illustrated in FIG. 2, a variety of threaded screws 31 can be used to attach a cover 30 to a base 20. Data storage device components can be made from a wide variety of materials such as metal, plastic, ceramic, and combinations thereof. Nonlimiting examples of metals include aluminum, and alloys thereof.

Nonlimiting examples of data storage device housing components include a hard disk drive base, a hard disk drive process cover, and a hard disk drive final cover. In some embodiments, a process cover can be attached to a base during manufacturing and then a final cover can applied over the process cover toward the end of manufacturing to form a final data storage device. Data storage device housing components can be made from a wide variety of materials such as metal, plastic, ceramic, and combinations thereof. In some embodiments, a cover can be made of materials including aluminum, steel, magnesium, alumina, combinations of these, and the like.

Solid state deposition processes function by propelling particles at high velocity to impact a substrate (e.g., a surface of a data storage device component and/or housing component). When the particles impact the substrate, the particles undergo solid-state plastic deformation and fusion, forming a bond (e.g., metallurgical bond) to the surface and a relatively dense coating on the surface. Accordingly, solid-state deposition is an additive process that can build up a deposition layer or a joint to a desired thickness. In some embodiments, the solid-state material may be deposited according to "cold-spray" process, which is a gas-dynamic acceleration of particles to supersonic velocities such as 300-1200 m/sec.

Because solid state deposition is a solid state process, it has one or more advantages such as reduced heat input, oxidation, and grain growth. Further advantages of solid state deposition, and in particular cold spray are as follows: high deposition rate, little or no masking required, no grit blast required, high density, flexibility in substrate coating, minimum thermal input to substrate, high bond strength, compressive residual stresses, ultra-thick coatings are possible, no undue oxidation, no undue grain growth, high conductivity, high corrosion resistance, and high strength and hardness.

A cold spray process may include directing powder particles and a carrier gas through a nozzle. In some embodiments, the carrier gas is heated. The resulting high-velocity particle-gas mixture may thus be directed at a substrate. As the high-velocity particle-gas mixture impacts the substrate, a layer of deposited material may form thereon as the particles plastically deform and bond to substrate. As additional particle-gas mixture is directed to the substrate, the thickness of the resulting layer of deposited material continues to build to the extent desired.

One advantage of solid state deposition processes such as cold spray is that the material from which the powder particles are formed may be selected to define a desirable characteristic. For example, the material defining the powder particles may be selected to match the material defining the substrate. In some embodiments, the powdered particles are formed from aluminum. However, differing materials may be selected in other embodiments. Another advantage of cold spray is that it can produce coatings having a reduced level of coating oxidation and improved level of electrical conductivity as compared to other spray processes. Cold spray coatings can also exhibit one or more of improved adhesion, reduced material loss by vaporization, low gas entrapment, insignificant grain growth and recrystallization, low residual stress, phase and compositional stability, reduced masking requirements and improved surface finishes.

The powder particles for cold spray can be selected to flow through a nozzle as described above. Cold spray can be performed with atomized powder. The atomization process can generate spherical particulates which flow well through the nozzle. For cold spray, the powder particles can be in the range of 1-50 µm (micrometers) diameter. Uniformity of the size of the powder particles is advantageous in that deposition rates tend to increase with less variation in size.

With respect to the gas used in a cold spray process, nonlimiting examples include helium, nitrogen and the like. In some embodiments, inert gases such as helium or nitrogen can be selected. In some embodiments, helium can be used to cold spray some high melting temperature alloys so that appropriate velocities can be achieved to provide the kinetic energy sufficient for the particle to bond with the substrate on impact. In this regard, the sonic velocity of helium is desirable. Helium may also be desirable if the gas is heated for a particular cold spray application. For example, a carrier gas may be pre-heated to about 800° C. (1472° F.), or below the melting point of many metals, to increase the velocity and/or aid in particle deformation.

A nozzle for cold spray may be provided in various forms. For example, in a low pressure application, a de Laval nozzle may be employed. By way of further example, in a high-pressure application (e.g., up to 500 psi (3.5 MPa)), a supersonic nozzle may be employed. Additionally, in some embodiments it may be desirable to spray a relatively large area in a single pass, for example to decrease cycle times associated with solid state deposition. Accordingly, multiple nozzles may be employed. Alternatively, a nozzle including multiple ducts may be employed to spray over a relatively wider area than a nozzle including a single duct. Thus, in some embodiments the solid state deposition may be completed in a single-pass.

An example of cold-spray deposition is reported in U.S. Pat. No. 9,951,425 (Lancaster-Larocque et al.), wherein the entirety of said patent is incorporated herein by reference.

A wide variety of materials can be used for solid-state deposition. In some embodiments, at least one solid-state deposition layer is made of material chosen from ductile metals and alloys, polymers and polymers, or blends of >50 vol % ductile materials with brittle metals or ceramics. Nonlimiting examples of metallic particles that can be deposited via solid-state (e.g., via cold spray) include metals and/or metal alloys such as one or more of zinc (Zn), tin (Sn), nickel (Ni), chromium (Cr), silver (Ag), copper (Cu), aluminum (Al), titanium (Ti), niobium (Nb), molybdenum (Mo), nickel-chromium (NiCr), copper-aluminum (Cu—Al), aluminum alloys, nickel alloys, steel, and MCrAlYs, where M=cobalt, nickel, or cobalt/nickel. Nonlimiting examples of ceramic particles that can be deposited via solid-state (e.g., via cold spray) include one or more of alumina (aluminum oxide), silicon nitride, zirconium oxide, aluminum nitride, silicon carbide, and tungsten carbide. In some embodiments, any of the mentioned metal and ceramic particles can be combined together and applied via cold spray to form a composite material of metal and ceramic.

A solid-state deposition layer according to the present disclosure can have a wide variety of thicknesses. In some embodiments, the thickness of a layer may be one inch or less, for example in the range from 0.001 inches to 0.1 inches. In some embodiments, the thickness of a layer may vary throughout the layer, e.g., to manage weight, joint strength and/or humidity control.

A solid-state material according to the present disclosure can be deposited in a wide variety of patterns. In some embodiments, a pattern may be an irregular pattern of discontinuous regions on a surface of data storage device component. For example, one or more layers of solid-state material can be applied in the form of a joint (similar to a weld) to join substrates and/or to fill a gap to seal an interior of a data storage device (e.g., for humidity control).

According to one aspect of the present disclosure a method of joining data storage device components includes applying at least one solid-state deposition layer as a "pre-weld" treatment to one or more surfaces to be subsequently joined via a solid-state joint process such as friction-stir welding.

Figure 3A:
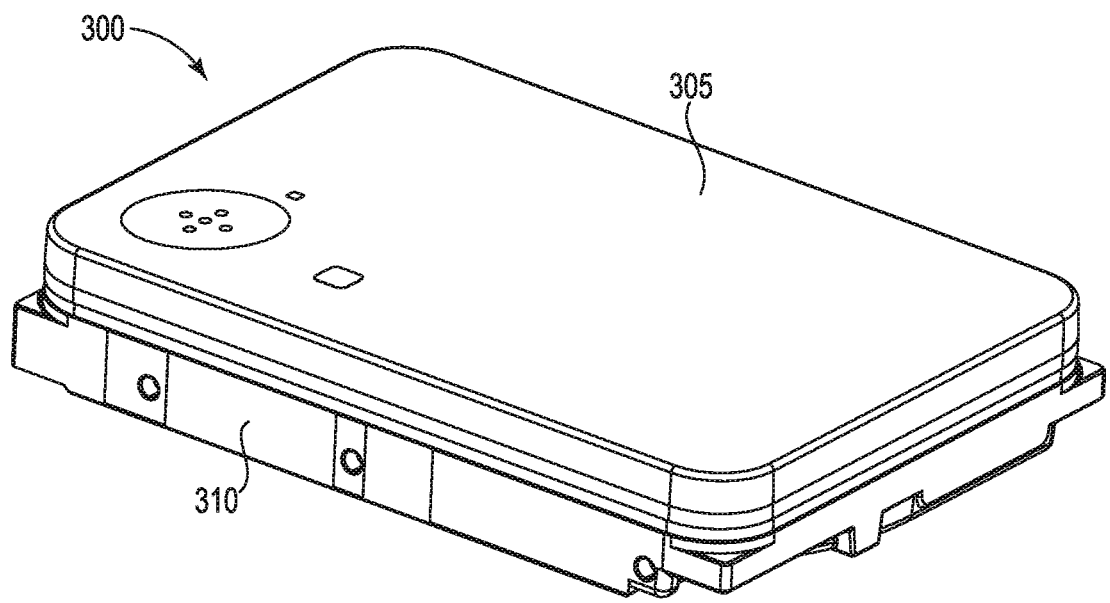
FIG. 3A is a perspective view of a hard disk drive that includes a final hard disk drive cover positioned on a hard disk drive base.
Figure 3B:
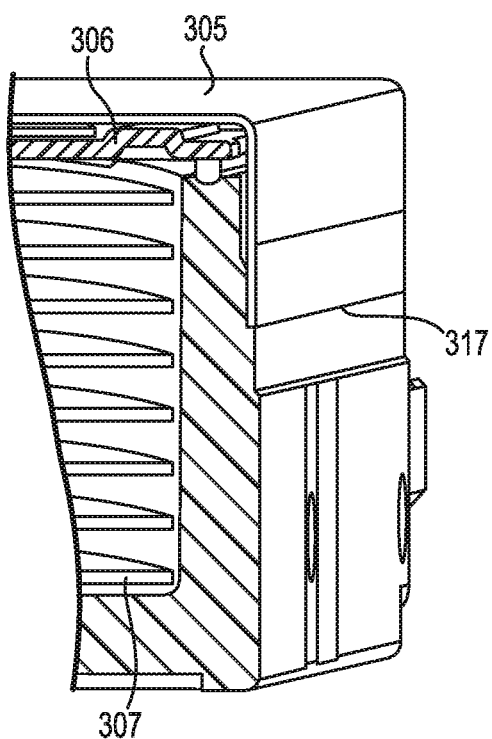
FIG. 3B is a partial cross-section view of the hard disk drive shown in FIG. 3A.

A nonlimiting example of applying at least one solid-state deposition layer as a "pre-weld" treatment is illustrated herein with respect to FIGS. 3A-3D. FIGS. 3A and 3B show a hard disk drive 300 that includes a final cover 305 in position over process cover 306 and on base 310 in an aligned (abutting) manner to form joint line 317. As shown, final cover 305 is a metallic substrate such as aluminum that has been formed (e.g., stamped) into the shape of final cover 305. Also, base 310 is a metallic substrate such as cast or wrought aluminum. FIG. 3B is a cross-sectional view of the hard disk drive 300 shown in FIG. 3A showing a plurality of disks 307. Note that in FIGS. 3A and 3B, the final cover 305 is not yet secured to base 310 in a sealed manner such as with a weld along joint line 317. But, the final cover 305 may be held in position with respect to the base 310 via an interference fit or friction fit so that final cover 305 may be subsequently joined (e.g., welded) to the base 310. In this context, each of final cover 305 and base 310 can be considered as an "intermediate" before hard disk drive 300 is in a final product form. As used herein, "intermediate" means in each of final cover 305 and base 310 are in position to be connected, but not physically connected in a permanent manner yet (e.g., are not welded together yet).

Figure 3C:
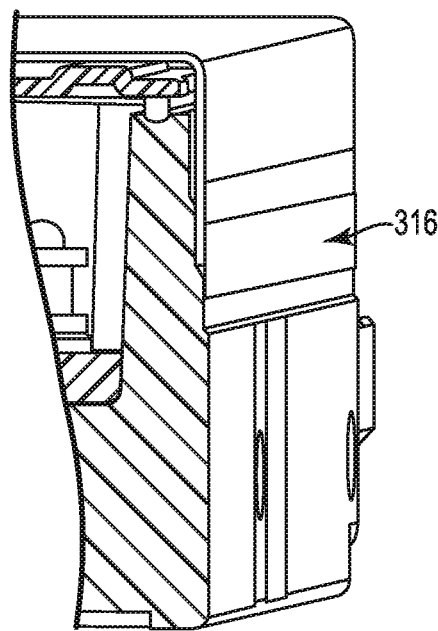
FIG. 3C is a cross-section view of the hard disk drive shown in FIG. 3B after applying a solid-state deposition coating.

According to the present disclosure, at least one solid-state, metallic deposition layer is applied over at least a portion of one or more surfaces of the final cover 305 and/or at least a portion of one or more surfaces of the base 310. As shown in FIG. 3C, at least one solid-state, metallic deposition layer 316 is applied (e.g., cold-sprayed) onto both the final cover 305 and the base 310 along the entire joint line 317 around the perimeter of hard disk drive 300. The solid-state, metallic deposition layer 316 could be applied to the final cover 305 and base 310 separately before assembling them together, or after assembling final cover 305 and base 310 together (but before welding) as shown in FIGS. 3A-3C.

Figure 3D:
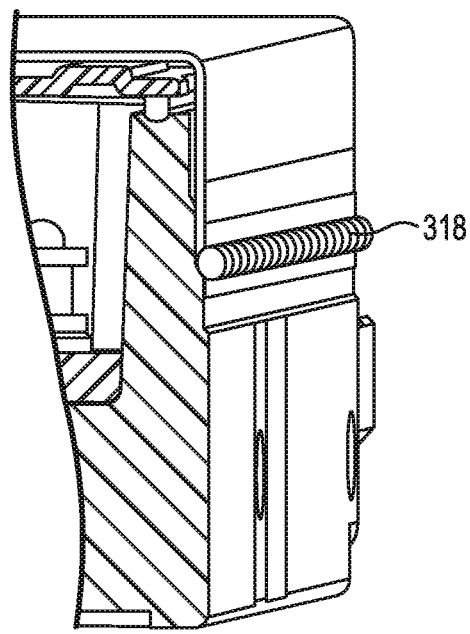
FIG. 3D is a cross-section view of the hard disk drive shown in FIG. 3C after welding the base to the final cover.

After applying solid-state, metallic deposition layer 316 to the final cover 305 and base 310, the final cover 305 and base 310 are welded, as shown in FIG. 3D, along the joint line 317 to form a weld 318. Nonlimiting examples of welding include friction stir welding or laser welding.

For friction stir welding, the mating surfaces of the final cover 305 and base 310 can be clamped together at joint line 317 by a clamping tool (not shown). Friction stir welding involves rotating a tool at a suitable speed while in contact with substrates to be joined. Friction can be created due to rotating the tool, which imparts heat sufficient to stir up the material on both sides of the joint line 317 between the final cover 305 and base 310. The material stirred up can include the material that each of final cover 305 and base 310 are formed from as well as the solid-state metallic deposition layer 316. Also, while rotating the tool, the tool may be actuated along the joint line 317 to form weld 318 and join final cover 305 and base 310 together. Friction stir welding is also described in U.S. Pat. No. 9,951,425 (Lancaster-Larocque et al.), wherein the entirety of said patent is incorporated herein by reference. Laser welding in the context of a hard disk drive is described in U.S. Pat. No. 8,533,934 (McGuire, Jr. et al.), wherein the entirety of said patent is incorporated herein by reference.

In some embodiments, base 310 can be a "cast" base or a "wrought" base. A cast base can be made of one or more alloys (e.g., aluminum alloy) by pouring molten aluminum alloy into a mold to form base 310. A wrought base can also be made of out of one or more alloys (e.g., aluminum alloy) and can be formed into base 310 by processes that include rolling, extrusion, machining and forging. It is noted that alloys for wrought bases tend to be different in composition than casting alloys. For example, casting alloys tend to have relatively higher silicon content as compared to wrought alloys. While cast bases tend to be less expensive than wrought bases, cast bases tend to have relatively more material quality issues (e.g., voids, porosity, gate breakouts, vent breakouts, and the like). Such material issues can interfere with subsequent welding processes to an undue degree. While voids and porosity in cast bases tend to impact friction stir welding to a lesser degree as compared to laser welding, such issues can impact friction stir welding an undue degree if they are severe enough. Also, friction stir welding a hard disk drive cover (e.g., final cover) to a cast base can create a weld that appears to relatively rough, less uniform, and of lower quality.

Applying at least one solid-state, metallic deposition layer as a "pre weld" treatment according to the present disclosure can advantageously change or adjust the metallurgical composition of a subsequent weld as compared to if the pre-weld treatment had not been applied.

For example, a solid-state, metallic deposition layer could be applied to an area of one or more metallic substrates to be welded, where the deposition layer has a composition that is different from the underlying metallic substrate(s). In some embodiments, one or more layers 316 of magnesium (or alloys thereof) could be applied to final cover 305 and base 310 (e.g., a cast base), followed by friction stir welding final cover 305 to base 310 to form a weld 318 and physically join final cover 305 to base 310 in a manner that seals the interior of hard disk drive 300 from the exterior. Friction stir welding could incorporate the magnesium into the weld 318 so as to improve the appearance of weld 318 with respect to, e.g., uniformity and/or roughness. In other embodiments, one or more layers 316 of an aluminum alloy having better weld characteristics could be applied to final cover 305 and base 310 (e.g., an aluminum cast base), followed by laser welding final cover 305 to base 310 to form a weld 318 and physically join final cover 305 to base 310 in a manner that seals the interior of hard disk drive 300 from the exterior. Accordingly, applying a solid state deposition layer according to the present disclosure can make cast bases more acceptable. In some embodiments, the hard disk drive base 310 is made of an aluminum composition, the hard disk drive cover 305 is made of steel, and the at least one solid-state, metallic deposition layer 316 is a zinc composition. Advantageously, the zinc composition can adjust the composition of the subsequent weld 318 so as to make the weld 318 less susceptible to galvanic corrosion.

Optionally, referring to FIG. 3D, after forming weld 318 at least one solid-state, metallic deposition layer (not shown) can be applied over at least a portion of the weld 318. For example, a layer of an aluminum composition could be applied over weld 318 to improve the appearance of weld 318 and/or to seal any leaks along joint line 317 that may be remaining after forming weld 318 and that would allow moisture to pass between the interior and exterior and affect interior humidity of that hard disk drive 300 to an undue degree.

According to another aspect of the present disclosure, a method of sealing at least a portion of a data storage device interior from the exterior includes applying at least one solid-state deposition layer over at least a portion of one or more surfaces of a data storage device that may be susceptible to fluid communication between the interior of a data storage device and the exterior of the data storage device. For example, it may be desirable to seal one or more areas of a data storage device to control the humidity within the interior of a data storage device. Humidity control in the interior of a hard disk drive can be especially important in the context of heat-assisted magnetic recording (HAMR).

Nonlimiting examples of sealing the interior of a data storage device according to the present disclosure are illustrated herein with respect to FIGS. 4A, 4B, 5A, 5B, 7A and 7B.

Figure 4A:
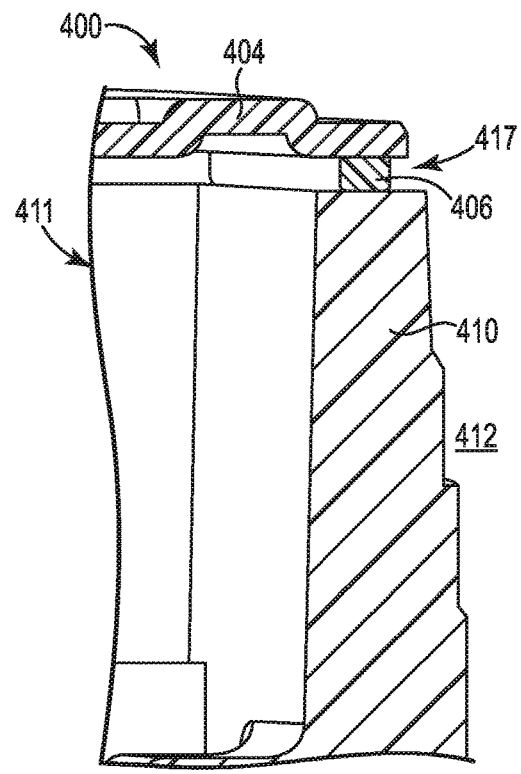
FIG. 4A is a partial cross-section view of a 3.5 inch hard disk drive showing a process cover fastened to a base with gasket material.

FIG. 4A shows a hard disk drive 400 that includes a process cover 404 in position on base 410 in an aligned (abutting) manner to form joint line 417. During manufacture a process cover 404 can be physically secured to base 410 via gasket 406 while the hard disk drive 400 is tested for one or more metrics. Gasket 406 can be used around the entire perimeter of the hard disk drive 400 and can be considered a temporary seal for manufacturing purposes to seal the hard disk drive interior 411 from the hard disk drive exterior 412. The temporary seal can be designed to maintain the gas pressure (e.g., helium pressure) and/or humidity within the interior 411 during at least the testing process. Also, by installing a process cover as a temporary seal the process cover can be relatively easy to remove to rework the interior of the drive if needed as indicated by the testing process.

As shown, process cover 404 is a metallic substrate such as aluminum that has been formed (e.g., stamped) into the shape of process cover 404. Also, base 410 is a metallic substrate such as cast or wrought aluminum.

According to the present disclosure, at least one solid-state deposition layer can be applied to cover at least a portion of a joint line between two substrates to seal the interior of the data storage device from the exterior.

Figure 4B:
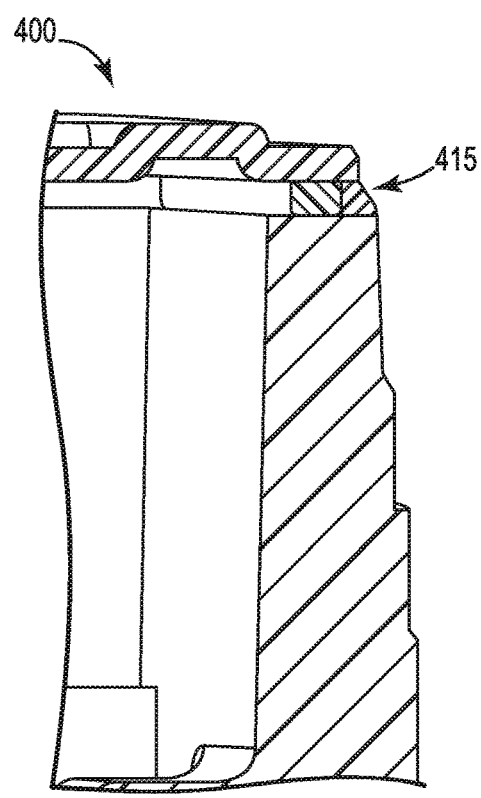
FIG. 4B is a cross-section view of the 3.5 inch hard disk drive shown in FIG. 4A after being sealed with a solid-state deposition layer.
Figure 5A:
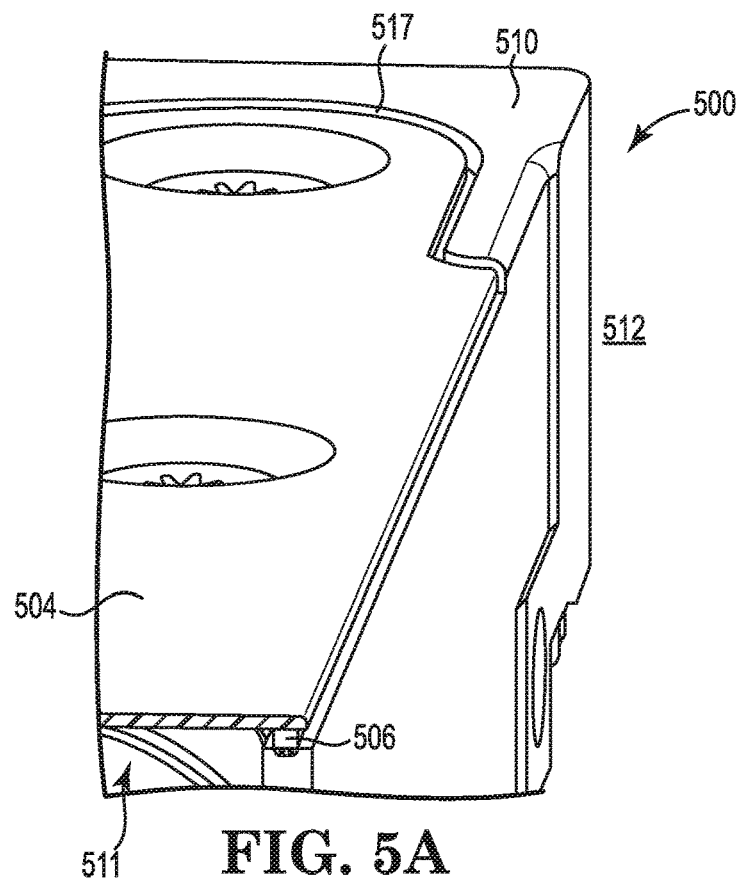
FIG. 5A is a partial cross-section view of a 2.5 inch hard disk drive showing a process cover fastened to a base with gasket material.
Figure 5B:
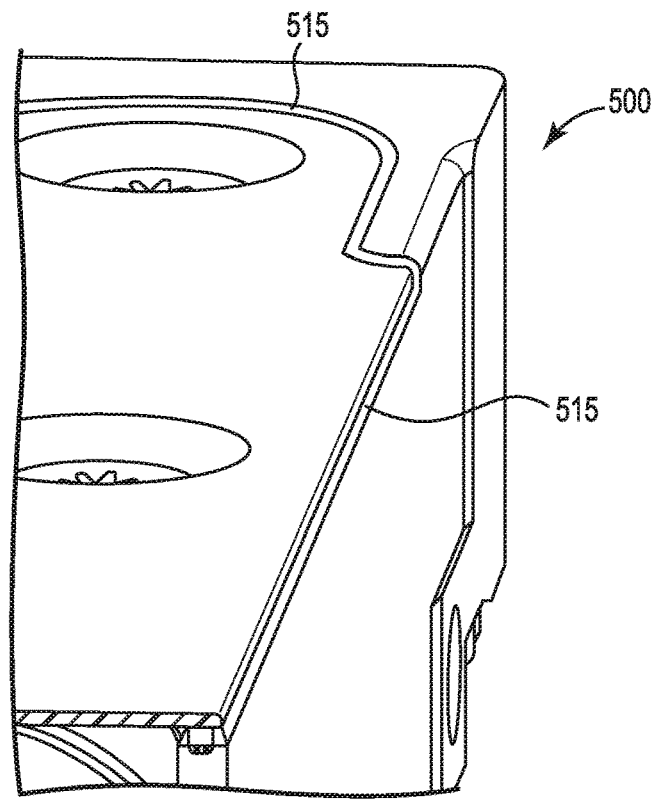
FIG. 5B is a cross-section view of the 2.5 inch hard disk drive shown in FIG. 5A after being sealed with a solid-state deposition layer.

For example, as shown in FIG. 4B, a solid-state deposition layer 415 can be applied to cover the gasket 406 and joint line 417 and fill the gap between the process cover 404 and the base 410 to seal the interior 411 of the hard disk drive 400 from the exterior 412. FIGS. 4A and 4B illustrate sealing a process cover 404 to a base 410 for a 3.5 inch hard disk drive 400. FIGS. 5A and 5B illustrate the same concept for sealing a process cover 504 to a base 510 for a 2.5 inch hard disk drive 500.

FIG. 5A shows a hard disk drive 500 that includes a process cover 504 in position on base 510 in an aligned (abutting) manner to form joint line 517. During manufacture a process cover 504 can be physically secured to base 510 via gasket 506 in a temporary manner while the hard disk drive 500 is tested for a variety of metrics. Gasket 506 can be used around the entire perimeter of the hard disk drive 500 and can be considered a temporary seal for manufacturing purposes to seal the hard disk drive interior 511 from the hard disk drive exterior 512. The temporary seal can be designed to maintain the gas pressure (e.g., helium pressure) and/or humidity within the interior 411 during at least the testing process.

As shown, process cover 504 is a metallic substrate such as aluminum that has been formed (e.g., stamped) into the shape of process cover 504. Also, base 510 is a metallic substrate such as cast or wrought aluminum.

As shown in FIG. 5B, a solid-state deposition layer 515 can be applied to cover the gasket 506 and joint line 517 between the process cover 504 and base 510 to seal the interior 511 of the hard disk drive 500 from the exterior 512. In some embodiments, the layer 515 can be applied to the entire joint line 517 (perimeter).

When manufacturing is nearing completion, a final cover can be installed over the process covers 404 or 504 if desired, and sealed to the base 410 or 510, respectively, via a welding process such as friction stir welding or laser welding. A final cover can be installed to help provide a durable seal that can last for the life of the data storage device such as a hard disk drive. One drawback of a final cover is that it adds material and labor cost, and adds height to the hard disk drive.

In some embodiments, joining a process cover to a base with a solid-state deposition process such cold-spray as described above with respect to FIGS. 4B and 5B can create a seal (e.g., a hermetic seal) that lasts for the life time of the corresponding hard disk drive and avoid the need for a final cover. Accordingly, in some embodiments, joining a hard disk drive process cover to a hard disk drive base by depositing a material via cold spray can form a final hard disk drive that does not include a final cover.

Figure 7A:
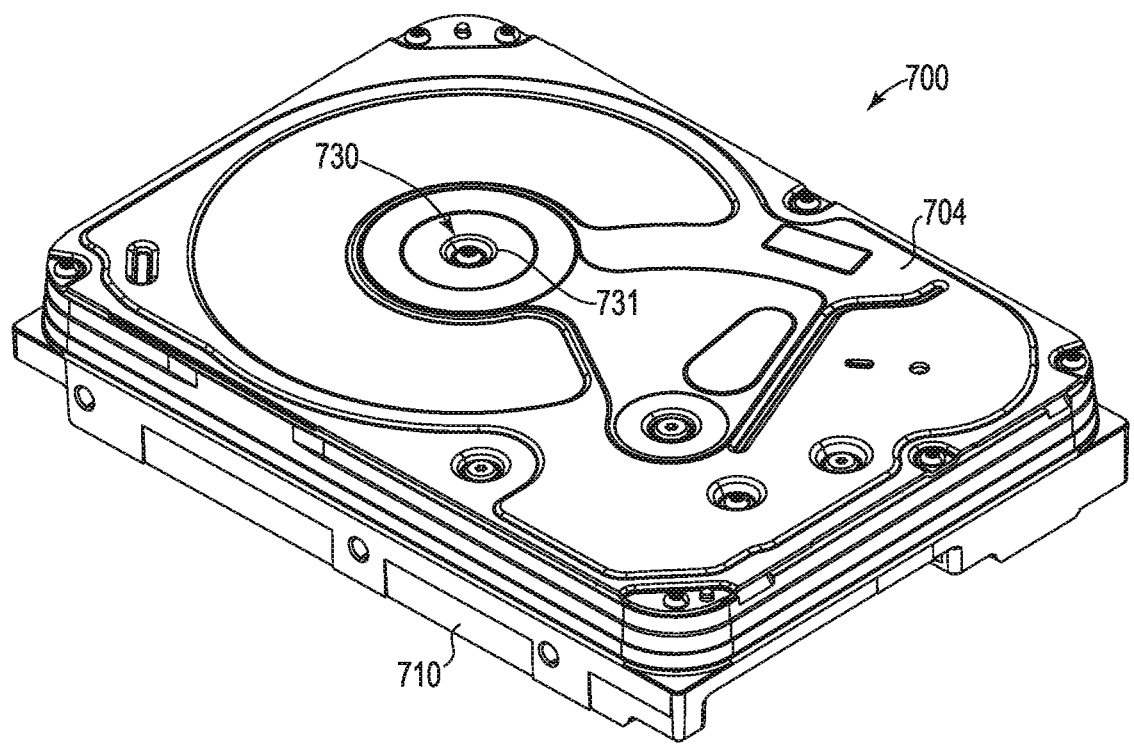
FIG. 7A is a top perspective view of a 3.5 inch hard disk drive showing fasteners through a process cover.
Figure 7B:
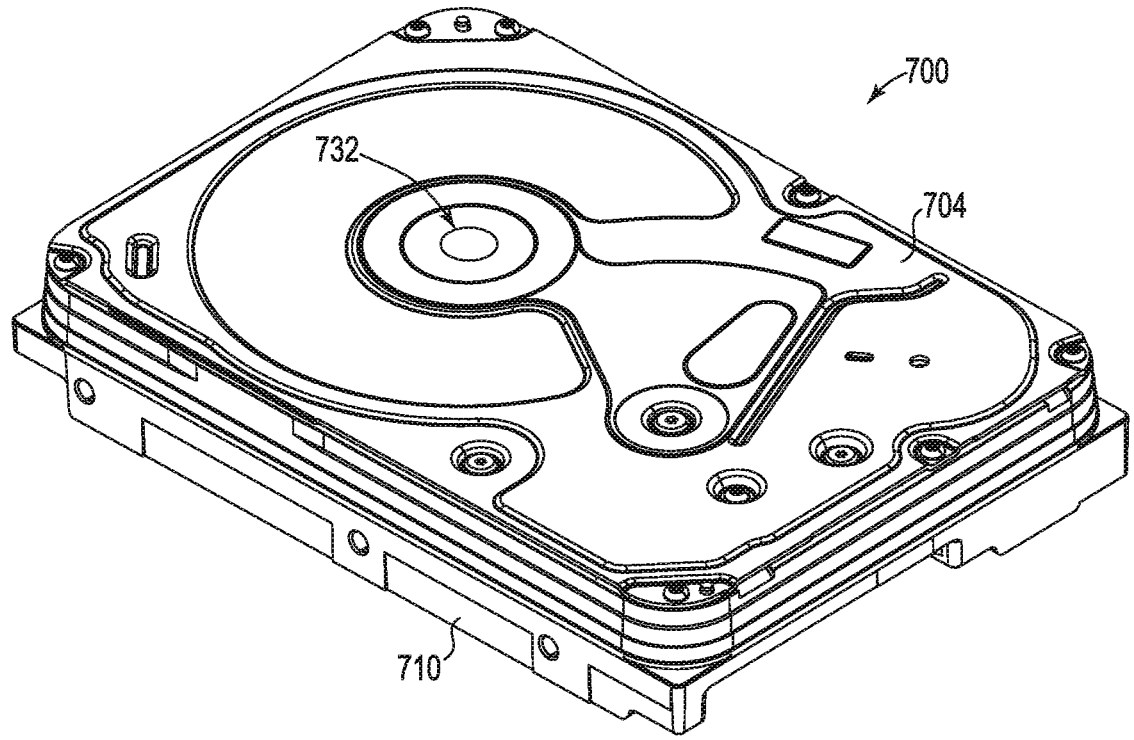
FIG. 7B is a top perspective view of the 3.5 inch hard disk drive shown in FIG. 7A after applying a solid-state deposition layer over a screw head.

According to the present disclosure, one or more solid-state deposition layers can be applied to any gap or through-hole in a housing to help seal the interior of a data storage device such as a hard disk drive. By way of example, FIGS. 7A and 7B illustrate how a solid-state deposition layer can be applied where a fastener (e.g., a screw) passes through a housing component such as a process cover. As shown in FIG. 7A, hard disk drive 700 includes a process cover 704, a base 710 and a screw 730 that helps attach process cover 704 to base 710. The screw 730 and process cover 704 form a joint line 731. As shown in FIG. 7B, a solid-state deposition layer 732 can be applied over the screwhead and completely cover the joint line 731 to help seal the interior of the drive 700 from the environment external to hard drive 700.

As mentioned above, one or more solid-state deposition layers can be applied to at least a portion of a hard disk drive to help seal the interior of the drive. In some embodiments, sealing the interior of a data storage device such as a hard disk drive refers to maintaining a relative humidity within the hard disk drive interior space for a given amount of time. As used herein, "relative humidity" refers to the ratio of the partial pressure water vapor in a mixture of gas (e.g., air) and water to the equilibrium vapor pressure of water over a flat surface of water at a given temperature. The ratio can then be expressed as a percentage.

In some embodiments, the relative humidity of the interior of a hard disk drive can be 40% or less at 25° C., 30% or less at 25° C., 20% or less at 25° C., 10% or less at 25° C., or even 1% or less at 25° C. In such embodiments, the relative humidity of the interior of the hard disk drive can be maintained for a time period of at least 7 years, at least 6 years, at least 5 years, at least 4 years, at least 3 years, at least 2 years, or even at least 1 year. For example, the relative humidity of the interior of the hard disk drive can be maintained for a time period of 6 months to 7 years. Some hard disk drives may have specifications that permit a relatively larger relative humidity than other hard disk drive specifications. For example, a heat a heat-assisted magnetic recording (HAMR) disk drive may specify that the relative humidity of the interior of the hard disk drive be 1% or less at 25° C. for at least 7 years. While at least some other non-HAMR disk drives may specify that the relative humidity of the interior of the hard disk drive be 20% or less at 25° C. for at least 7 years.

According to another aspect of the present disclosure, at least one solid-state deposition layer can be applied to cover at least a portion of the joint line to physically couple a first substrate to a second substrate in a data storage device, such as coupling housing components together and/or coupling a data storage device component to a housing component. Solid-state deposition such as cold-spray deposition is an additive process so a layer or joint can be built up to a desired degree. For example, solid state deposition can be used to join housing components (e.g., physically coupling a cover (final and/or process covers) to a base). As another example, solid state deposition can be used to couple data storage device components (e.g., pass-through connectors and the like) to housing components (e.g., a cover and/or a base). In some embodiments, adhesives and/or soldering can advantageously be avoided for joining substrates if desired. Adhesives and/or soldering can be sensitive to whether a substrate surface has been properly prepared and/or to the geometry of a substrate. In some embodiments, welding via laser welding and/or friction stir welding a final cover to a base can advantageously be avoided if desired. Avoiding laser welding can reduce or eliminate material sensitivity associated with laser welding. Avoiding friction stir welding can reduce or avoid deformation associated with friction stir welding, especially with respect to housing components having relatively thin walls (e.g., a based having a thickness less than 0.04 inches).

Nonlimiting examples of joining substrates in a data storage device are illustrated herein with respect to FIGS. 6A, 6B, 8A, and 8B.

Figure 6A:
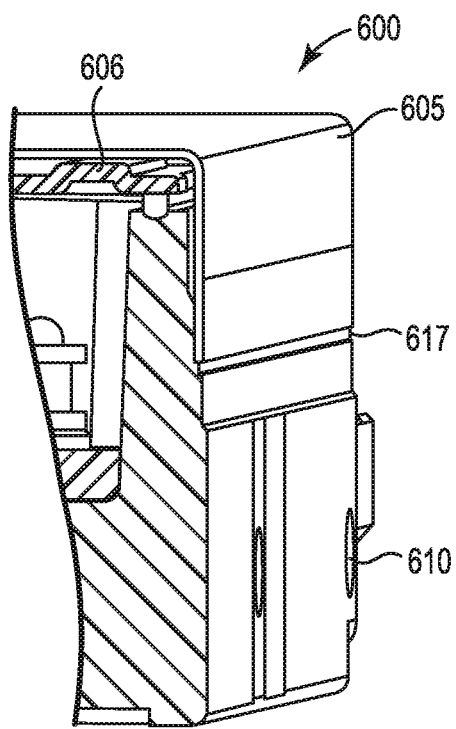
FIG. 6A is a partial cross-section view of a 3.5 inch hard disk drive showing a final cover in position to be joined to a base.

FIG. 6A shows a hard disk drive 600 that includes a final cover 605 in position on base 610 in an aligned (abutting) manner to form joint line 617. As mentioned above, toward the end of manufacturing hard disk drive 600 after testing is complete, a final cover 605 can be positioned over process cover 606 and permanently joined to base 610.

As shown, final cover 605 is a metallic substrate such as steel. Also, base 610 is a metallic substrate such as cast or wrought aluminum.

According to the present disclosure, at least one solid-state deposition layer can be applied to cover at least a portion of a joint line between two substrates to join the two substrates.

Figure 6B:
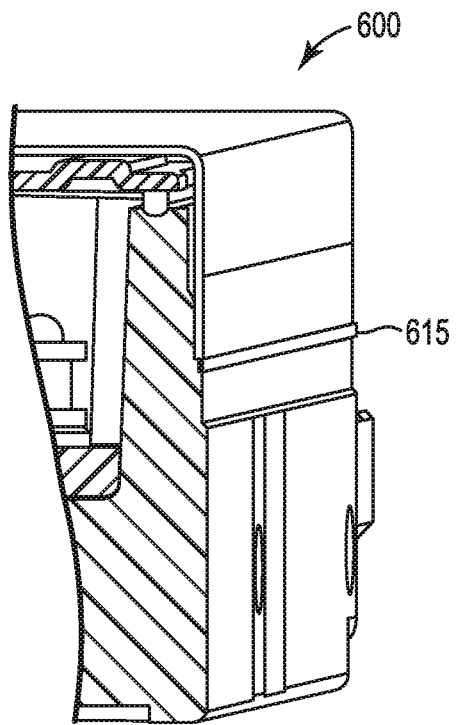
FIG. 6B is a cross-section view of the 3.5 inch hard disk drive shown in FIG. 6A after joining the final cover to the base with a solid-state deposition layer.

For example, at least one solid-state deposition layer can be applied to cover at least a portion of a joint line between two housing components such as a base and a cover (process cover and/or final cover). As shown in FIG. 6B, a solid-state deposition layer 615 can be applied to the joint line 617 and fill the gap between the final cover 605 and the base 610 to join (physically couple) the final cover 605 to the base 610. In some embodiments, 615 can be applied to the joint line 617 to join final cover 605 and base 610 in a sealed manner as discussed above with respect to FIGS. 4A, 4B, 5A, 5B, 7A, and 7B.

Figure 8A:
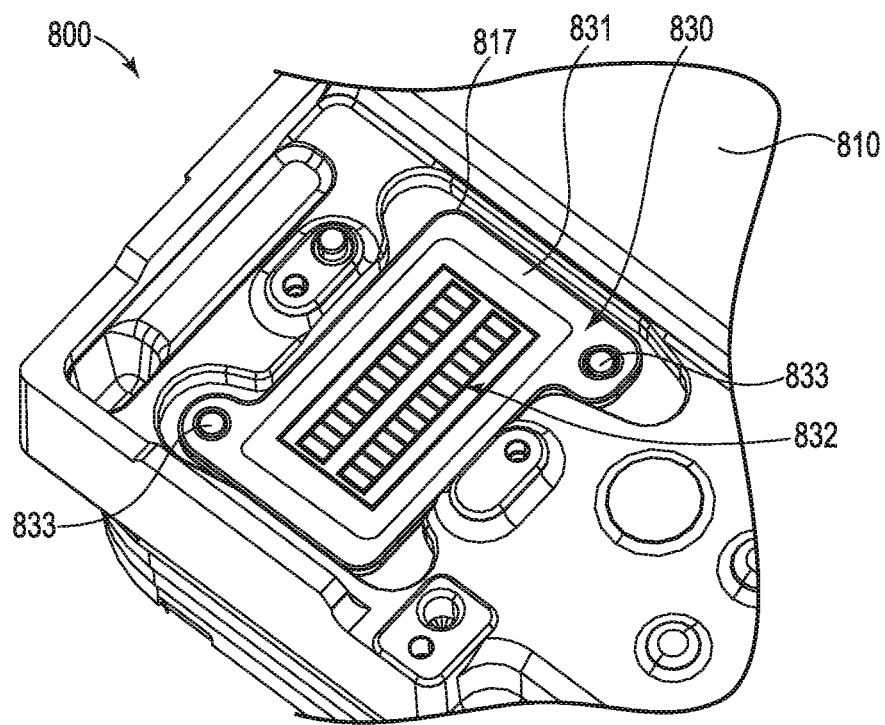
FIG. 8A is a partial, bottom perspective view of a hard disk drive showing a pass-through connecter mounted in the base.
Figure 8B:
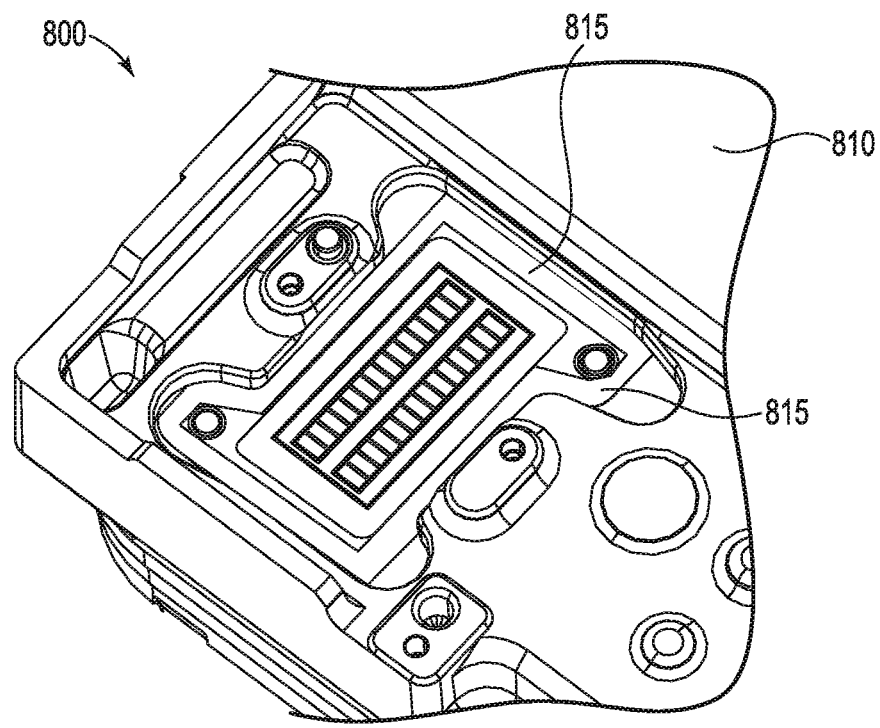
FIG. 8B is a bottom perspective view of the hard disk drive shown in FIG. 8A after applying a solid-state deposition layer around the perimeter of the pass-through connector.

As another example, at least one solid-state deposition layer can be applied to cover at least a portion of a joint line between a housing component and a data storage device component. Nonlimiting examples of a housing component include a base and/or a cover (process cover and/or final cover). FIGS. 8A and 8B show illustrate a "pass-through" connector as an example of an electrical connector. As shown in FIG. 8A, the bottom of a hard disk drive 800 that includes an electrical connector 830 positioned proximal to the perimeter of a through-hole (within the through-hole) in base 810 to form joint line 817. As shown, base 810 is a metallic substrate such as cast or wrought aluminum. Electrical connector 830 is a device that permits electrical signals to be passed between the exterior of hard disk drive and the interior of hard disk drive 800 while maintaining the interior as a sealed environment with respect to the exterior (e.g., to control the humidity of the interior as described herein). As shown, electrical connector 830 includes a perimeter flange 831 for mounting the connector 830 to the bottom of base 810 via one or more locating pins 833 (two pins are shown). Electrical connector also includes exposed metal 832 for making an electrical connection.

According to the present disclosure, as shown in FIG. 8B, a solid-state deposition layer 815 can be applied to at least a portion of joint line 817 to join (physically couple) the electrical connector 830 to the base 810. As shown, solid-state deposition layer 815 is applied to the entire perimeter of joint line 817. In some embodiments, 815 can be applied to the joint line 817 to join the electrical connector 830 and the base 810 in a sealed manner as discussed above with respect to FIGS. 4A, 4B, 5A, 5B, 7A, and 7B. Also, the solid-state seal 815 can be used instead of using an adhesive on flange 831 if desired.

What is claimed is:

1. A method of joining a first data storage device component and a second data storage device component, wherein the method comprises:
    a) providing the first data storage device component, wherein the first data storage device component comprises a first metallic substrate;
    b) providing the second data storage device component, wherein the second data storage device component comprises a second metallic substrate;
    c) applying at least one solid-state, metallic deposition layer over at least a portion of one or more surfaces of the first metallic substrate and/or at least a portion of one or more surfaces of the second metallic substrate;
    d) aligning at least a portion of the first metallic substrate and at least a portion of the second metallic substrate along a joint line, wherein at least a portion of the at least one solid-state, metallic deposition layer is along at least a portion of the joint line; and
    e) welding the first metallic substrate to the second metallic substrate along the joint line.

2. The method of claim 1, wherein the first data storage device component comprises a first data storage device housing component and the second data storage device component comprises a second data storage device housing component.

3. The method of claim 2, wherein the first data storage device housing component comprises a hard disk drive base and the second data storage device housing component comprises a hard disk drive final cover.

4. The method of claim 1, wherein at least one solid-state, metallic deposition layer is applied via cold-spray.

5. The method of claim 1, wherein the first metallic substrate and the second metallic substrate are welded via friction stir welding or laser welding.

6. The method of claim 3, wherein the hard disk drive base is a cast base comprising a first metallic composition, wherein the at least one solid-state, metallic deposition layer comprises a second metallic composition, and wherein the first metallic composition is different from the second metallic composition.

7. The method of claim 3, wherein the hard disk drive base comprises a first metallic composition, wherein the hard disk drive cover comprises a second metallic composition, wherein the at least one solid-state, metallic deposition layer comprises a third metallic composition, and wherein the first metallic composition, the second metallic composition, and the third metallic composition are all different from each other.

8. The method of claim 1, further comprising, after step (e), applying at least one solid-state, metallic deposition layer over at least a portion of the joint line between the first metallic substrate and the second metallic substrate that have been joined by welding.

\* \* \* \* \*